United States Patent [19]
Park et al.

[11] Patent Number: 6,151,597
[45] Date of Patent: Nov. 21, 2000

[54] HOST DBMS SIMULATOR AND SIMULATION METHOD THEREOF

[75] Inventors: Young Ho Park; Wan Choi, both of Daejeon, Rep. of Korea

[73] Assignees: Electronics and Telecommunications Research Institute, Daejeon; Korea Telecom, Seoul, both of Rep. of Korea

[21] Appl. No.: 09/136,174

[22] Filed: Aug. 19, 1998

[30] Foreign Application Priority Data

Dec. 17, 1997 [KR] Rep. of Korea ...................... 97-69472

[51] Int. Cl.⁷ .................................................. G06F 17/30
[52] U.S. Cl. .................................................................. 707/1
[58] Field of Search .................................. 707/1–4, 101, 707/104, 200; 395/500.42, 500.43

[56] References Cited

U.S. PATENT DOCUMENTS

| | | | |
|---|---|---|---|
| 5,410,693 | 4/1995 | Yu et al. | 707/100 |
| 5,995,968 | 11/1999 | Park | 707/100 |

OTHER PUBLICATIONS

Park et al., "Implementation Issues of Host DBMS Simulator Supporting the Test for Distributed Databases in Switching Software," Proceedings of the 12th Int'l Conference on Information Networking, pp. 709–712, Jan. 21–23, Jan. 1998.

Kristan Rekdal, "Chill—The International Standard Language for Telecommunications Programming," Telektronikk, vol. 89, No. 2/3, May 10, 1993, ISSN 0085–7130.

*Primary Examiner*—Paul V. Kulik
*Attorney, Agent, or Firm*—Antonelli, Terry, Stout & Kraus, LLP

[57] ABSTRACT

A host DBMS simulator and simulation method thereof which can simulate an exchanger application program made out into CHILL/C in one's host system by a user using a host system under the exchanger's execution environment and similar simulation environment. A simulator is provided which can directly simulate an exchanger application software not on an exchanger main but on a host system. The exchanger has a problem of limit of resources consumption which cannot simulate the execution blocks of loaded application software with multi-users' interconnection simultaneously. Because of achieved of the package form of one unite performance environment, in the case that one user simulates in the exchanger, it is difficult that there cannot be performed a simulation in the case of adding new functions, changing, connecting the existing function. However, there is an effect which can solve by providing an environment which can load various databases as an administration command provided in the present simulator. The system which multiple users can use simultaneously has an effect which can newly and efficiently apply on the exchanger program simulation by providing the construction method of these host DBMS simulator systems.

17 Claims, 9 Drawing Sheets

HOST DBMS SIMULATOR AND SIMULATION METHOD THEREOF

BACKGROUND OF THE INVENTION

1. Field of the Invention

The present invention generally relates to a host DBMS simulator and simulation method thereof and, more particularly, to a host DBMS simulator and simulation method thereof which can simulate an exchanger application program made out into CHILL/C in one's host system by a user using a host system under the exchanger's execution environment and similar simulation environment.

2. Discription of the Prior Art

There was developed a host DBMS at first at Korea Electronics and Telecommunications Research Institute in 1989. Its name was called a host DBMS. This existed in the form of library. To use this, when the application program is compiled, to be executed upon linking a conventional host DBMS and making a simplified executing file.

However, these simplified practice file can simulate one's function in any constant time, however, there was a problem which can not perform various simulations due to having a limitation about that multiple executing files can not be performed simultaneously.

Further, after the exchanger program makes out an application program upon using an user's host system, therefore, there was a problem -which can not perform various simulations about developed application programs according to being performed upon loading the execution file to the exchanger.

SUMMARY OF THE INVENTION

It is an object of the present invention to provide a host DBMS simulator and simulation method thereof which can simulate an exchanger application program made out into CHILL/C in one's host system by a user using a host system under the exchanger's execution environment and similar simulation environment.

In order to accomplish the above object, the present invention provides a first means, which comprises: an user part of a performable A address space composed of a query of EDML(Embedded Data Manipulation Language) form included in a plurality of application CHILL/C program extended to a code which CHILL/C compiler can recognize, EDML processor and compiler compiling the extended code, an application executing file of executing file generated through said compiler and host library, a PLD (Processor Load Data), and an administration command loading said a PLD to the server, providing the usage authority to the loaded a PLD, and carrying out a series of server executing environment setting work of permitting share; a HDS server part of a performable C address space composed of a HDS(Host DBMS Simulator) server and DBMS(Database Management System) kernel; and an IPC part of performable B address space controlling the communication of said user part and HDS server part composed of a shared memory and message queue.

In order to accomplish the above object, the present invention provides a second means, which comprises: a library generating means generating a library; a HDS server generation means generating the HDS server; a communication control means controlling communication between a library and server generated respectively from said library and HDS server generating means; a first library process means processing an user library when a query process requirement occurs in CHILL/C program which users make out; a service process means processing the service requested to the HDS server through the library processed from said library process means; a second library process means processing the library during communication between the library and HDS server when users require; an administration command process means processing an administration command during communication between the library and HDS server when users require; and a HDS server process means processing the HDS server during communication between the library and HDS server.

In order to accomplish the above object, the present invention provides a third means, namely, a host DBMS simulation method, which comprises procedures of: a first procedure generating a library; a second procedure generating a HDS server; a third procedure communicating between a library and server generated respectively through said first and second procedure; a fourth procedure processing an user library when a query process requirement occurs in CHILL/C program which users make out; a fifth procedure processing the service required to the HDS server through the library processed from said fourth procedure; a sixth procedure processing the library during communication between the library and HDS server when users require; a seventh procedure processing an administration command during communication between the library and HDS server when users require; and an eighth procedure processing the HDS server during communication between the library and HDS server.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENTS

Hereinafter, the present invention will be explained in detail using the attached drawings.

Figure 1:
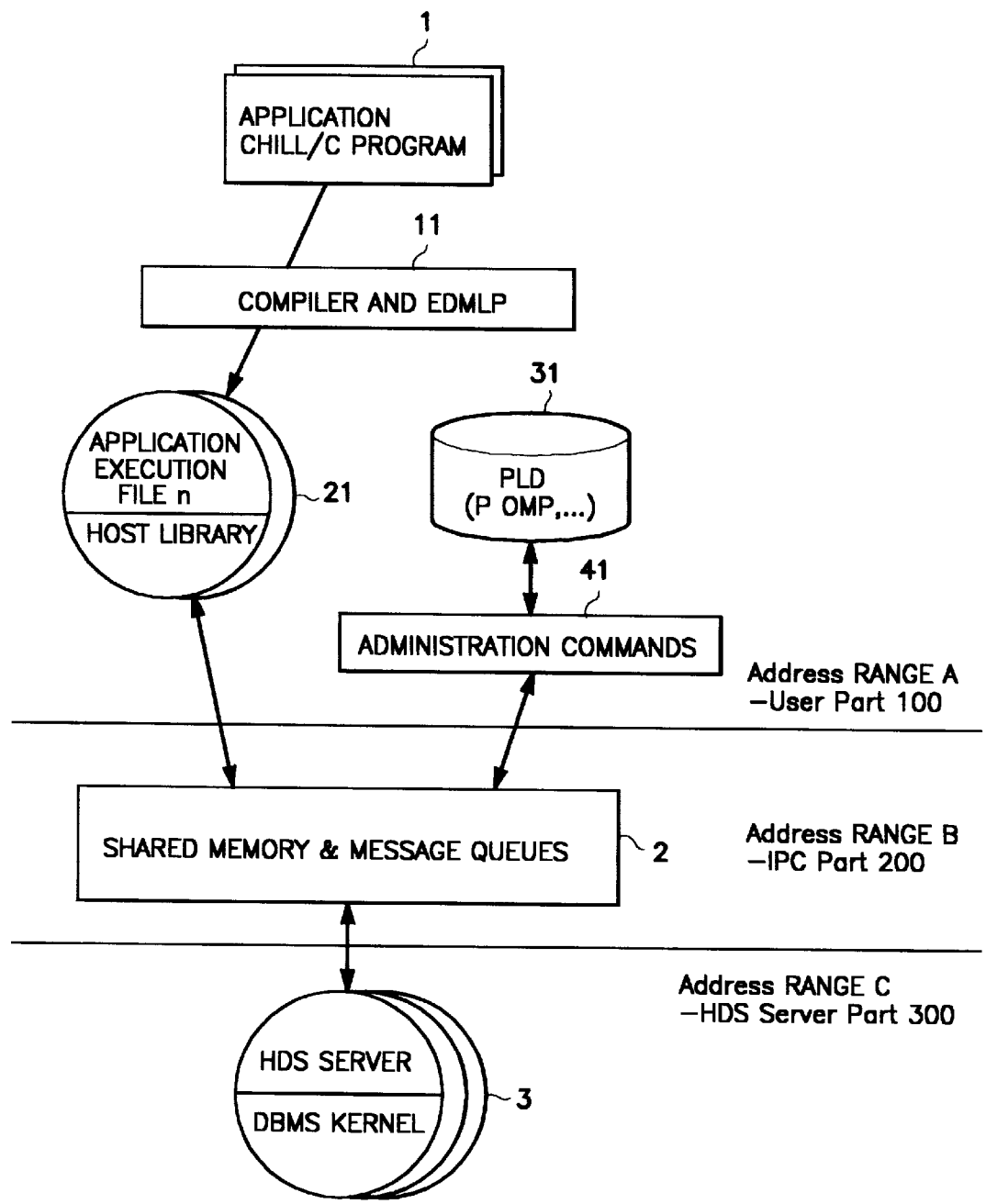
FIG. 1 is an overall block diagram of a Host DBMS Simulator(HDS) according to the embodiment of the present invention.

FIG. 1 shows an overall block diagram of a host DBMS simulator(HDS) by means of the embodiment of the present invention.

As shown in FIG. 1, after a host DBMS simulator according to the embodiment of the present invention extends a query language of the form of EDML(Embedded Data Manipulation Language) included in a plurality of application CHILL/C program 1 to a code which CHILL/C compiler can recognize, it comprises an address range A-user part permissible 100 composed of an EDMLP (Embeded Data Manipulation Language Processor) compiling the extended code and a compiler 11, an application execution file of an executing file generated through the compiler 11 and a host library 21, a PLD(Processor Load Data) 31 that is database, and an administration command 41 loading the a PLD 31 to a server, providing an usage authority to the roaded a PLD 31, carrying out a series of server execution environment setting work of permitting share, an address range C-HDS server part permissible 300 composed of a plurality of HDS(Host DBMS Simulator) server and DBMS(Database Management System) kernel 3, and an address range B IPC part permissible 200 controlling the communication between the user part and HDS server part, providing a shared memory and message queue 2.

FIGS. 2 through 9 show signal flow charts for explaining a host DBMS simulation method according to the embodiment of the present invention.

As shown in FIGS. 2 through 9, a host DBMS simulation method according to the embodiment of the present invention is composed of a first procedure generating a library, a second procedure generating a HDS server, a third procedure communicating between a server and a library generated through the first and second procedure, a fourth procedure performing an usage library when a query process requirement occurs in CHILL/C program which an user makes out, a fifth procedure performing a service required to HDS server through the library processed in the fourth procedure, a sixth procedure performing the library when communicating between a library and HDS server when users require, a seventh procedure performing an administration command when communicating between a library and HDS server when users require, and an eighth procedure performing HDS server when communicating between a library and HDS server when users require.

Figure 2:
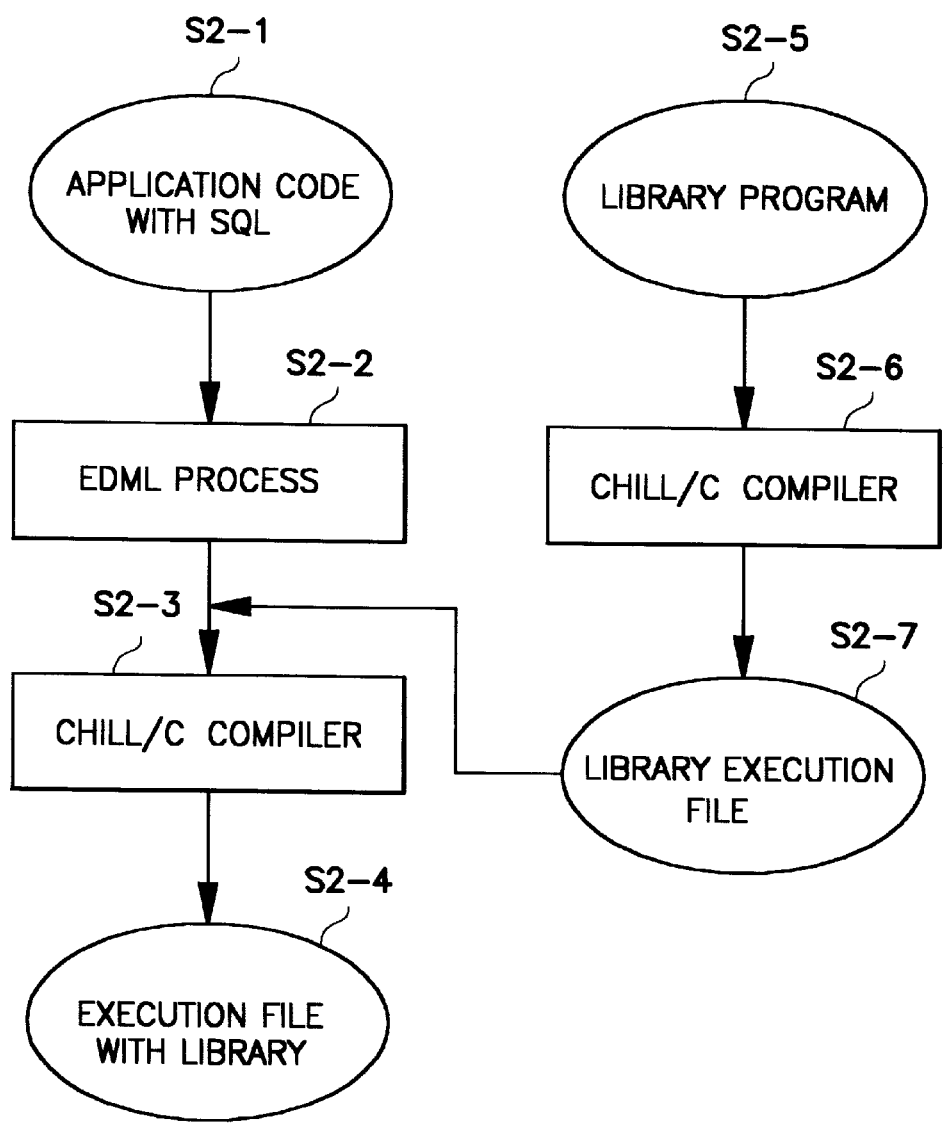
FIG. 2 is an illustrating view of procedure for generating a library of FIG. 1.

As shown in FIG. 2, the first procedure is composed of a first step extending a query EDML included in CHILL/C program to CHILL/C program upon performing by means of EDML process an application code(step S2-1) having a Structured Query Language( SQL) of software for driving an exchanger, a second step generating (step S2-4) a execution file having the library upon linking(step S2-3) the generated library execution file when CHILL/C- compiling CHILL/C program extended from the first step.

Figure 3:
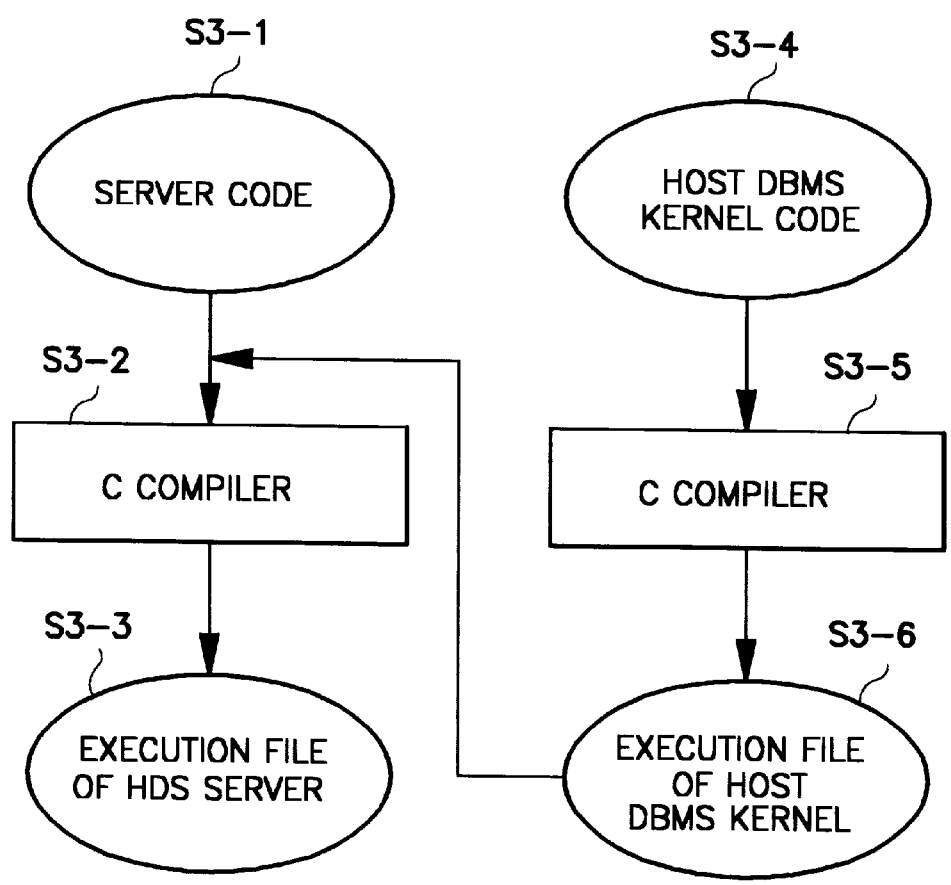
FIG. 3 is an illustrating view of procedure for generating a HDS server of FIG. 1.

As shown in FIG. 3, the second procedure is composed of a first step making out(step S3-1) HDS server code in C language, a second step generating(step S3-6) a DBMS kernel execution file for an object host after the kernel program(step S3-4) used in DREAM-S(Distributed REAL-time database Management system Scalable) of real time DBMS is compiled(step S3-5) by C compiler, and a third step generating(step S3-3) one server execution file after compiling(step S3-2) DBMS kernel execution file generated from the second step upon being linked to HDS server code from the first step.

Figure 5:
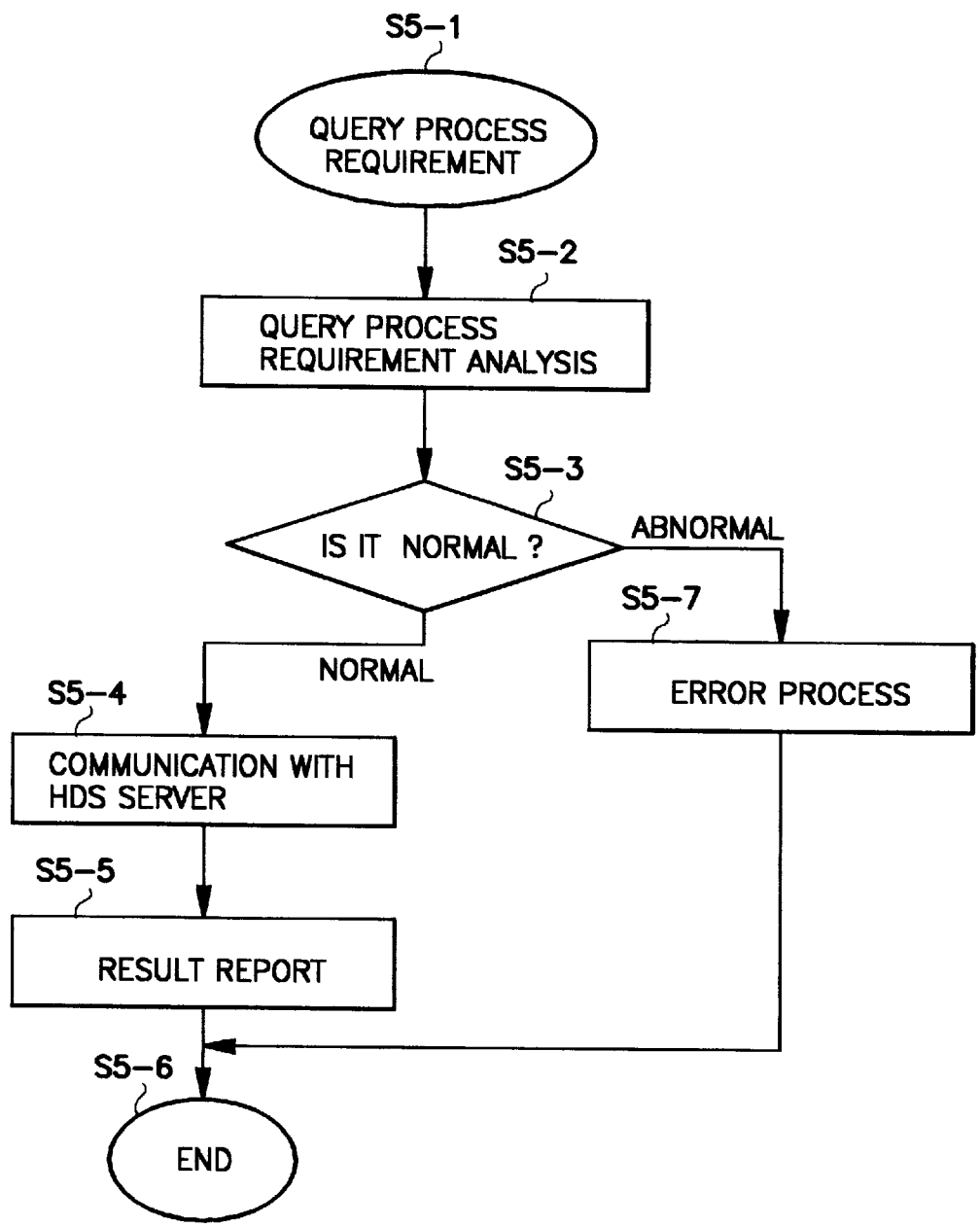
FIG. 5 is a flow chart in the library when a query process requirement occurs in CHILL/C program which users make out.

As shown in FIG. 5, the fourth procedure is composed of a first step deciding(step S5-3) about whether a normal command whose the performance is possible according to the analysis result is inputted or not after analyzing(step S5-2) in the host library one query process requirement(step S5-1) occurred in the user application program, a second step ending(step S5-6) the performance after performing (step S5-4) communication with HDS server in the case that a normal command whose the analysis result performance is possible is inputted according to the deciding result of the first step, reporting (step S5-5) the performing result in the patterned form to users, and a third step carrying out(step S5-7) the error process about the inputted query process requirement in the case of not processing the deciding result from the first step in the host DBMS simulator, or a wrong command requirement form, ending(step S5-6) the performance.

Figure 6:
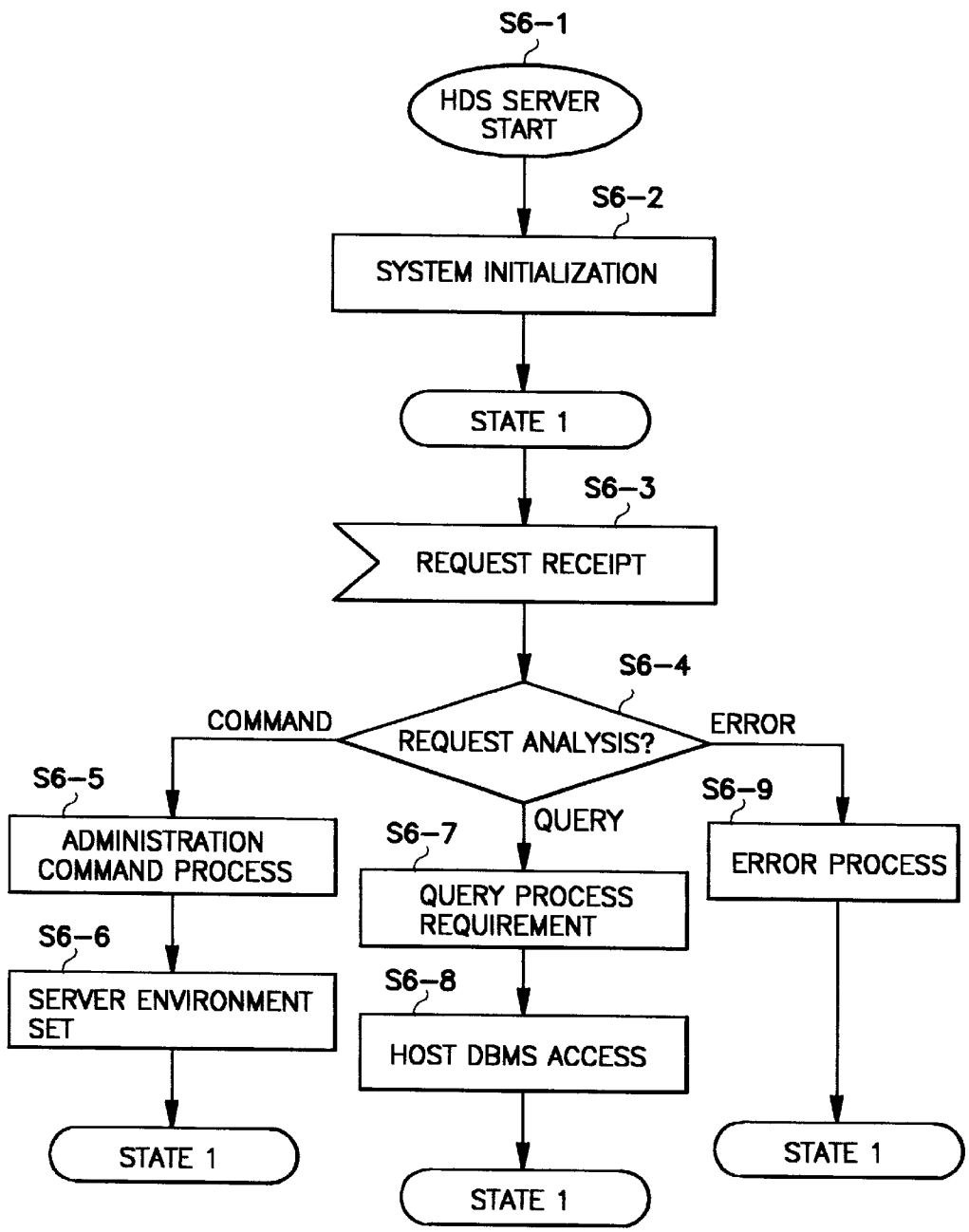
FIG. 6 is an illustrating view of procedure of which requirements are processed in a HDS server through the library.

As shown in FIG. 6, the fifth procedure is composed of a first step initiating (step S6-2) for performing the HDS server after the HDS server starts the performance by means of HDS server administrator, a second step analyzing(step S6-4) the requirement in the case that user's requirement requesting the process to HDS server is received(step S6-3), a third step performing (step S6-5) an administration command process routine if the requirement is an administration command for setting an administration environment according to the analysis result, again performing the second step after setting (step S6-6) the server environment, a fourth step performing (step S6-8) the query process(step S6-8) in the case of user query process requirement(step S6-7) according to the analysis result of the second step, ending the process after calling(step S6-8) a host DBMS, repeating and carrying out the second step, and a fifth step repeating and carrying out the second step after processing the error in the case that the error is confirmed on communication or process according to the analysis result of the second step.

Figure 7:
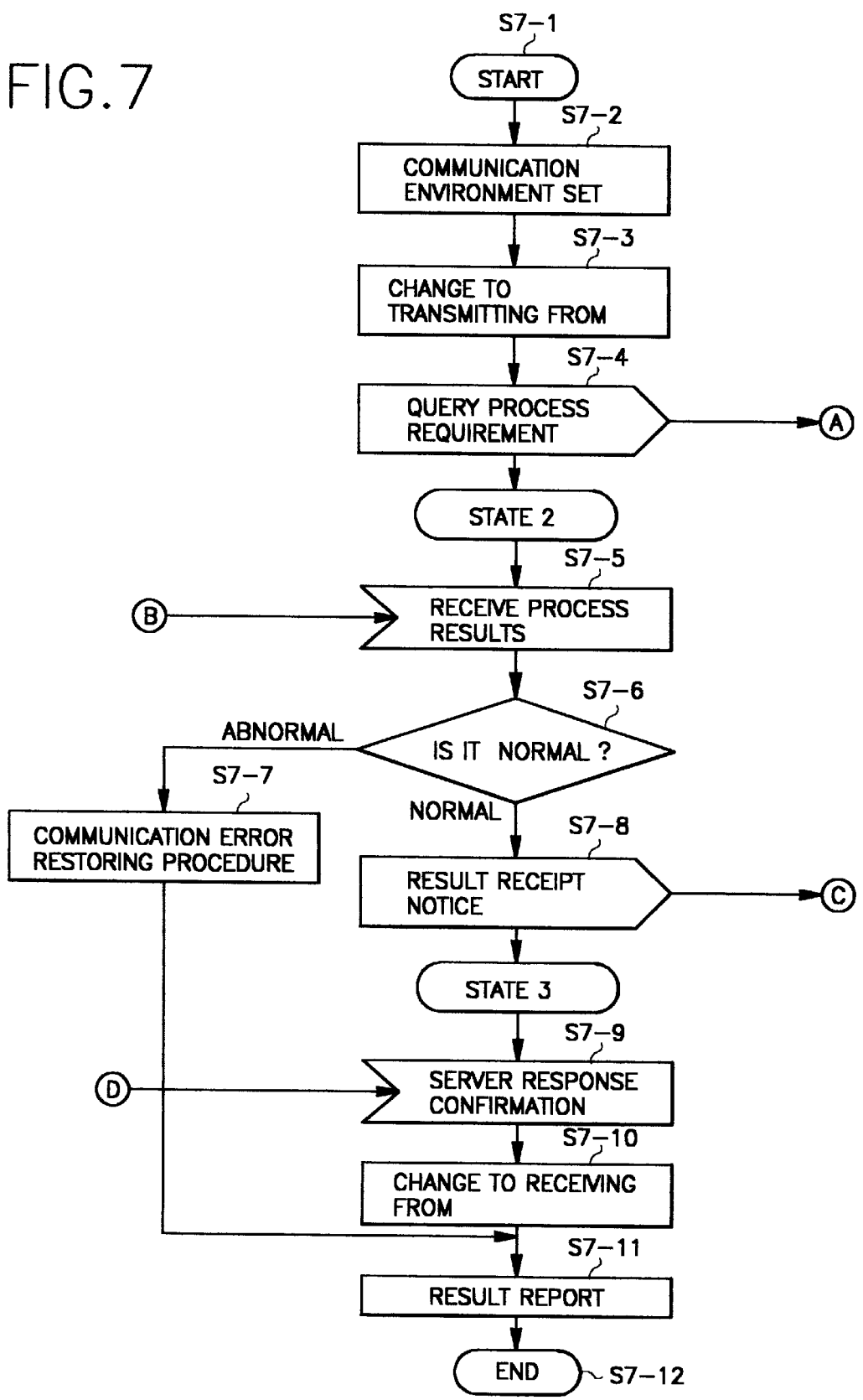
FIG. 7 is a view about a query process requirement which a library processes.

As shown in FIG. 7, the sixth procedure is composed of a first step setting (step S7-2) the communication environment for communicating with HDS server after starting(step S7-1) the user requirement, a second step changing(step S7-3) the data structure in the form of transmitting(step S7-4) information using the share memory, transmitting to HDS server using the message queue and share memory to the changed data structure, a third step receiving(step 7-5) the result after ending the requesting process, deciding(step S7-6) whether the received information is normal or not, a fourth step noticing(step S7-11) the result to users after passing the communication error restoring procedure(step S7-7) in the case of decided in the abnormal communication according to the deciding result from the third step, ending (step S7-12) the performance, a fifth step noticing (step S7-8) to the HDS server the contents about that the data receiving result is normal in the case of being decided in that the performance is normal according to the deciding result, confirming(step S7-9) the response if transmitting the response according as the HDS server receiving this confirms that the communication is accurately proceeded, changing(step S7-10) to the form of original data which users can perform from the form of share memory in the user side, and ending the performance after noticing (step S7-11) the performance result to the user.

Figure 8:
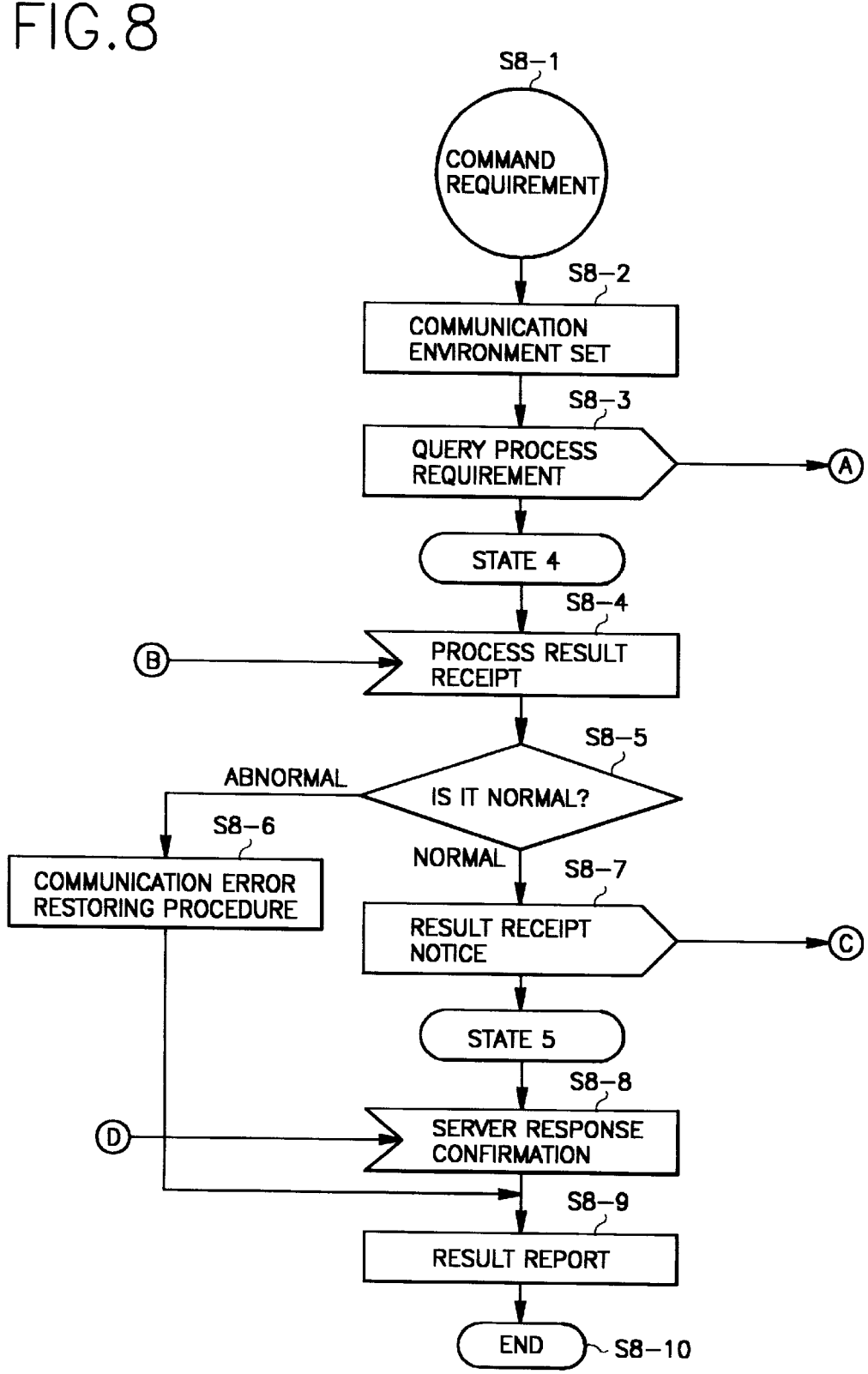
FIG. 8 is a view about an administration command.

As shown in FIG. 8, the seventh procedure is composed of a first step setting (step S8-2) the communication environment for communicating with HDS server when starting (step S8-1) the administration requirement, requiring(step S8-3) the query process upon transmitting the administration command to HDS server using the message queue, a second step receiving (step S8-45) the result after ending the process required from the first step, deciding whether the received information is normal or not, a third step noticing (step S8-9) the result to users after passing the communication error restoring procedure(step S8-6) in the case of being decided in that the communication is abnormal according to the deciding result from the second step, and a fourth step noticing(step S8-7) to HDS server the contents about that the data receiving result is normal in the case of deciding in that the received information is normal according to the deciding result from the second step, confirming the response if transmitting the response according as HDS server receiving this confirms that the communication is accurately proceeded, reporting (step S8-9) to users the performance result from HDS server to the administration command, and ending the performance (step S8-9).

Figure 9:
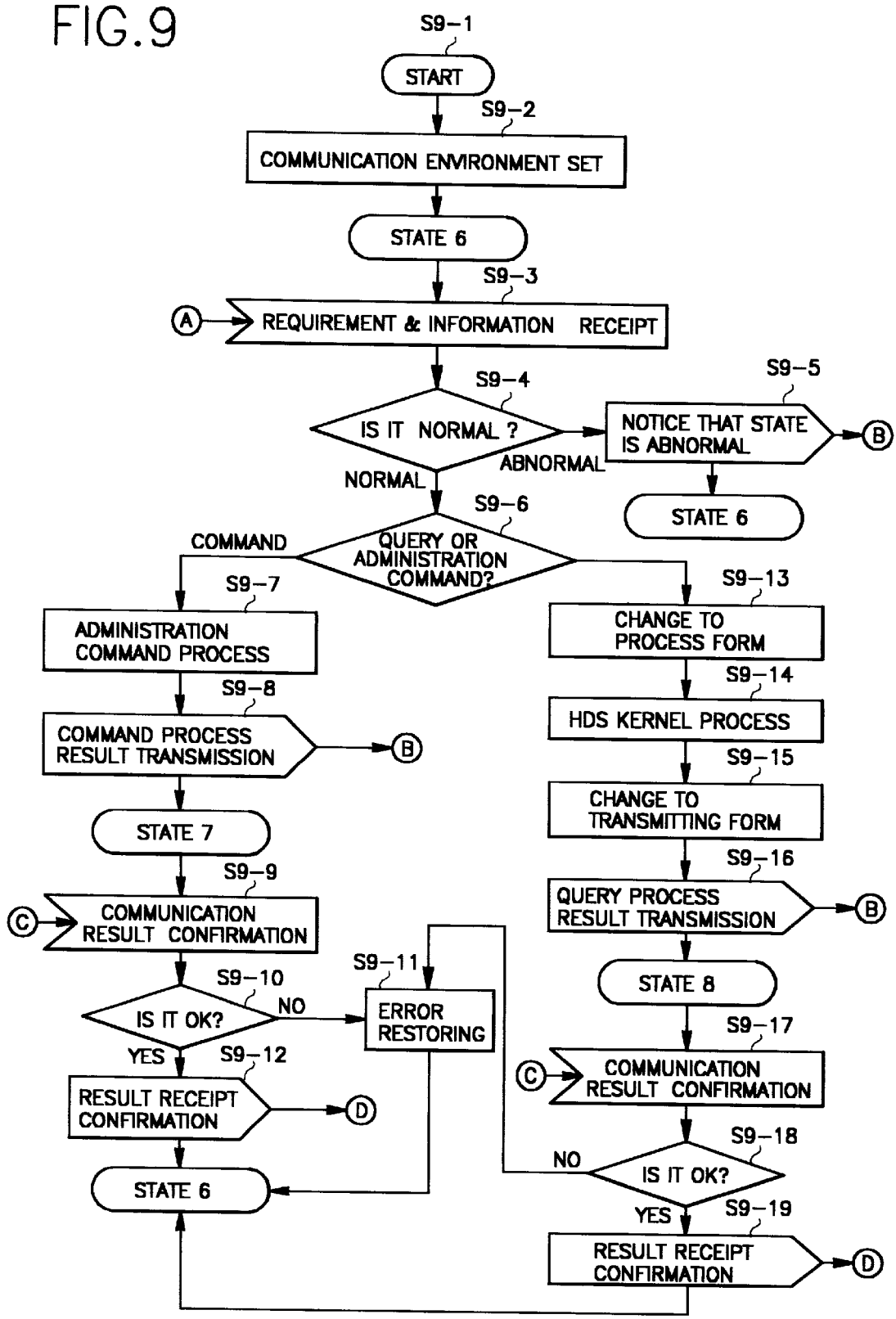
FIG. 9 is a flow chart of a HDS server interworked with users.

As shown in FIG. 9, the eighth procedure is composed of a first step setting (step S9-2) the communication environment for communicating with HDS server after starting(step S9-1) the user requirement, a second step receiving(step S9-2) the requirement and information from the user side, deciding (step S9-4) whether the received requirement and information are normal or not, a third step transmitting (step S9-5) to the user side requesting the reasons of data process disable or communication state in the case being decided in that the received requirement and information is abnormal according to the deciding result from the second, again performing the second step, and deciding(step S9-6) whether the corresponding requesting is an administration command or a query process requirement command if being decided in that the performing result is normal, a fourth step performing(step S9-7) the function processing an administration command in the case of the administration command according to the deciding result from the third step, transmitting( step S9-8) the processing result to the user side, a fifth step receiving(step S9-9) the response if the user side receiving the processing result transmitted from the fourth step transmits the confirmed response to one's receipt result, deciding(step S9-10) whether the receiving result is normal or not, a sixth step noticing(step S9-12) to the user side the performance resumption of HDS server side, again performing the second step, a seventh step restoring(step S9-11) the error in the case of decided in abnormal according to the deciding result from the fifth step, again performing the second step, an eighth step changing(step S9-13) the form of share memory into the processable form in the HDS kernel if the corresponding request is a query process command according to the deciding result from the third step, performing(step S9-14) the HDS kernel process procedure, changing(step S9-15) into the form of transmitting shared memory again to transmit to the user side the performing result finishing the kernel performance, transmitting(step S9-16) to the user side the query process result, a ninth step receiving(step S9-17) the response if the user side received from the eighth step transmits the confirming response to one's receipt result, deciding(step S9-18) whether the received result is normal or not, and a tenth step noticing(step S9-19) to the user side the performance resumption of HDS server side, again performing the second step, restoring(step S9-11) the error if the received result is decided in abnormal, again performing the second step.

The procedure of a host DBMS simulation method will be explained in detail according to the embodiment of the present invention as follows.

First, as shown in FIG. 1, a host DBMS simulator expresses the communication form between processes operating at address spaces different from each other using IPC.

The user side firstly is an application executing file, secondly, dynamically loading the database to the server, administration commands for sharing the loaded database.

After loading the database on the server side using the administration commands, to perform the compiled application carrying out files upon linking the library.

At this time, the performing file sends to the server side the included query requirement(EDML) using the provided communication environment, has the interworking structure due to receiving the result.

Accordingly, as shown in FIG. 1, the host DBMS simulator embodies the multiple server environment of the multiple user side for supporting the multiple performance to the multiple user's execution blocks, provides the transmitting and receiving function to the mass data using the shared memory.

This will be explained in detail with reference to FIGS. 2 through 9 as follows.

First, explaining FIG. 2, the step S2-1 is a software for driving an exchanger as the exchanger software, there can be used query process languages for using the database in this software.

These are through the process to EDML of the step S2-2. The query EDML included in CHILL/C program is extended to CHILL/C program in the case of passing this process. This extended CHILL/C program is compiled by means of CHILL/C compiler in the step S2-3.

At this time, in the steps S2-5 through S2-7, there is generated one executing file upon linking the library for the generated host DBMS in the step S2-4.

Accordingly, FIG. 2 shows a step generating one executing file upon linking the library routine to an application program.

Subsequently, explaining FIG. 3, a host DBMS simulator server is made out by means of C language in the step S3-1, this is compiled by C compiler in the step S3-2. At this time, in the step S3-4, the kernel program used in DREAM-S (Distributed REAL-time database Management system Scalable) of the real time DBMS is compiled by C compiler in the step S3-5, it becomes DBMS kernel executing file for the object host in the step S3-6. This kernel is compiled upon linked to the HDS server program in the step S3-6, to generate one server executing file in the step S3-3.

Figure 4:
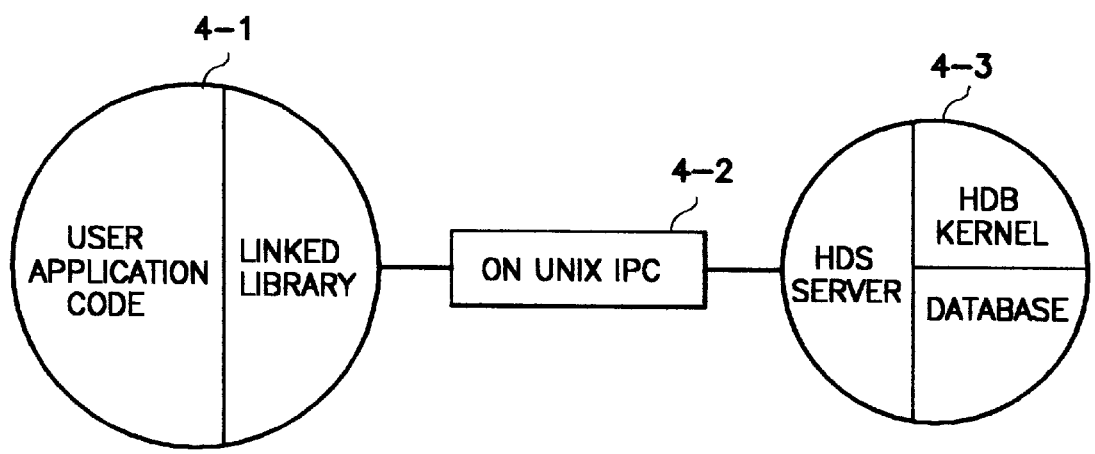
FIG. 4 is an illustrating view of communication process between a library and a server generated respectively in FIGS. 2 and 3.

Subsequently, explaining FIG. 4, the numeric 4-1 is an executing file of the user program generated through FIG. 2, the numeric 4-3 is an executing file of a host DBMS server generated through FIG. 3. The numeric 4-1 is the couple of the user program and the host DBMS library, in the step S4-3, composed of HDS server and kernel, the database to be loaded during operation.

These inter-communicate by means of UNIX IPC of the numeric 4-2. At this time, the UNIX IPC method used is message queues, shared memory, and semapo. Further, the signal was used for processing the fault which can be occurred between these.

Subsequently, explaining FIG. 5, the step S5-1 is one query process language occurred in the user application program. This query process language passes through the query process requirement analysis step in the host library in the step S5-2. At this time, in the step S5-3, if a normal command whose the performance is possible is inputted according to the analysis result in the step S5-3, to perform the communication with HDS server, end the performance in the step S5-6 after reporting the performing result in the patterned form to the user in the step S5-5.

In the case of not being able to process at a host DBMS simulator according to the confirming result of the step S5-3, or in the case that the command requirement form is not right, to execute the error process in the step S5-7 for the inputted query process requirement, and end in the step S5-6.

Subsequently, explaining FIG. 6, in the step S6-1, HDS server administrator starts operating HDS simulator. The exchanger is composed of several systems. For example, Hanbit/ACE ATM exchanger of ETRI is composed of sub-systems whose the usage purpose of OMP, CCCP00, CCCP01, etc. of sub-systems is different. One HDS server stands as a symbol for one's exchanger sub-system.

Therefore, the same server can not be performed more than one. However, there can be performed HDS server symbolizing other sub-system. As a result, the HDS server can be performed severally, the respective sub-system can be performed one by one.

After the HDS server starts the performance, there is started an initialization for performing the HDS server in the step S6-2. In the initialization, to perform the setting of the system data structure, IPC initialization, the respective kinds of variable setting, etc., if all settings are completed, finally, the preparation work is performed for accommodating the service received from the user according as the HDS server demon is performed.

In the step S6-3, in the case that the user requirement requesting the process to HDS server is received, these requirement performs the administration command process routine of the step S6-5, if this is the administration commands for setting the operation environment upon analyzing the requirement in the step S6-4, to perform the process routine of the operation commands of the step S6-5, again perform the step S6-3 after setting the server environment in the step S6-6.

If the analysis result of the step S6-4 is a process requirement of the user query, call a host DBMS in the S6-8, end the process, and return to the sep S6-3.

If the error is confirmed on the communication or process according to the analysis result of the step S6-4, process the error in the step S6-9, and perform the step S6-3. Such as this, the server carries out the consecutive performance, end normally if press Cntl-C when want to stop these performance.

Subsequently, explaining FIG. 7, it is connected with FIG. 9. The step S7-1 expresses the start of user requirement. The step S7-2 is to set the communication environment for communicating with the HDS server. The requirement for processing the query has various data, there is a change on its scale.

Therefore, the data is transmitted to the HDS server using shared memory. In the step S7-3, the data structure is changed in the form of transmitting the information using the shared memory. The changed data structure is transmitted to the HDS server using the message queue and shared memory in the step S7-4. After finishing the requesting process, the result can be received in the step S7-5, in the case of abnormal upon deciding whether the received information is normal or not in the step S7-6, to perform the communication error restoring procedure of the step S7-7, notice the result to users in the step S7-10, and end the performance in the step S7-12.

If the performance is normal according to the deciding result of the step S7-6, the contents about that the data receiving result is normal is noticed to the HDS server in the step S7-8. The HDS server receiving this confirms that the communication is accurately proceeded and sends the response, proceeds the performance. The response is received in the step S7-9, the user side receiving it changes it to the form of original data which users can process from the form of shared memory in the step S7-10, to notice the performance result to users in the step S7-11, and end in the step S7-12.

Subsequently, FIG. 8 connected with FIG. 9 is similar to the flow chart of FIG. 7, doesn't have the data for processing the query, has a characteristic in that the data doesn't change, doesn't use the shared memory. The administration command is operated on UNIX Shell similar to a general command. If their function is schematically examined, the database which users want is dynamically loaded to the HDS server, the usage authority is provided to users who loads the database, the usage cancellation is carried out for the loaded database by means of the user requirement, to perform the process of setting the HDS server administration environment which permits the share with multiple users for the loaded database.

If in detail explaining about FIG. 8, the step S8-1 expresses the start of administration requirement. The step S8-2 is to set the communication environment for communicating with the HDS server. In the step S8-3, the administration command is transmitted to the HDS server using the message queue. After finishing the requesting process, the result can be received in the step S8-4, in the case of abnormal communication upon deciding whether the received information is normal or not in the step S8-5, notice the result to users in the step 8-9, and end the performance in the step S8-10 through the communication error restoring procedure of the step S8-6.

If the performance is normal according to the deciding result of the step S8-5, notice to the HDS server the contents that the data receiving result is normal in the step S8-7. The HDS server receiving this confirms that the communication is accurately proceeded and sends the response, proceeds the performance. The response is received in the step S8-8, the user side receiving this notices to the users the performance result of the HDS server to the administration command in the step S8-9, and ends in the step S8-10.

Subsequently, FIG. 9 is connected with FIGS. 7 and 8. All processes explained in FIG. 9 insures an independent performance in the server using the semapo for the respective user side requirement.

As explained in the steps S7-1 and S7-2, the steps S9-1 and S9-2 have the requirement from the user side in the step S9-3, through the start process of the server. In the step S9-4, after deciding whether the received requirement is normal or not, in the case of decided in the abnormal, to be transmitted to the user side requesting the reasons of communication state or data process impossibility. Further, the step S9-3 is again performed. If the performing result of the step S9-4 is decided normally, in the case that the corresponding request is the administration command upon deciding whether it is the administration command or the query process requirement command, to perform the function processing the administration command in the step S9-7, and transmit the process result to the user side in the step S9-8.

The user side receiving this sends the confirmed response to one's receipt result, this is received in the step S9-9. If this result is normal in the step S9-10, the performance resumption of the HDS server side is noticed to the user side through the step S9-12, the step S9-3 is performed. If abnormal, the error is restored in the step S9-11, and the step S9-3 is carried out.

If the query process command according to the deciding result of the step S9-6, the shared memory form is changed in the form of process possibility in the HDS kernel in the step S9-13 according to changing the information of the received shared memory, and the HDS kernel is performed in the step S9-15.

After the performance result finishing the kernel performance is changed in the shared memory transfer form for transmission to the user side in the step S9-15, the query process result is transmitted to the user side in the step S9-16. The user side receiving this sends the response to one's receipt result, this is received in the step S9-17. If this result is normal in the step S9-18, the performance resumption of the HDS server side is noticed to the user side through the step S9-19, again perform the step S9-3. If abnormal, the error is restored in the step S9-11, again to perform the step S9-3.

The present invention firstly has an effect providing a simulator which can directly simulate an exchanger application software not on an exchanger main but on a host system.

The present invention secondly has an effect providing an exchanger which can perform similarly on a host a problem of limit of resources consumption which can not simulate the execution blocks of loaded application software with multi-users' interconnection simultaneously.

Thirdly, because of achieved of the package form of one unite performance environment, in the case that one user simulates in the exchanger, it is difficult that there can not be performed a simulation in the case of adding new functions, changing, connecting the existing function. However, as an administration command provided in the present simulator, there is an effect which can solve by providing an environment which can load various databases.

Fourthly, the present invention is a system which a multiple user can use simultaneously. The present invention has an effect which can newly and efficiently apply on the exchanger program simulation by providing the construction method of these host DBMS simulator systems.

As described above, although the present invention has been described in detail with reference to illustrative embodiments, the invention is not limited thereto and various modifications and changes may be effected by one skilled in the art within the scope of the invention.

What is claimed is:

1. A host DBMS simulation method, which comprises procedures of:
   a first procedure generating a library;
   a second procedure generating a HDS server;
   a third procedure communicating between a library and server generated respectively through said first and second procedure;
   a fourth procedure processing an user library when a query process requirement occurs in CHILL/C program which users make out;
   a fifth procedure processing the service required to the HDS server through the library processed from said fourth procedure;
   a sixth procedure processing the library during communication between the library and HDS server when users require;
   a seventh procedure processing an administration command during communication between the library and HDS server when users require; and
   an eighth procedure processing the HDS server during communication between the library and HDS server.

2. The host DBMS simulation method according to claim 1, wherein said first procedure is composed of a first step of extending a query EDML included in CHILL/C program to CHILL/C program upon processing by means of EDML an application code having Structured Query process Language (SQL) of software for driving an exchanger; and
   a second step of generating a library executing file upon CHILL/C compiling the library program, generating the executing file having the library upon linking the generated library executing file when CHILL/C- compiling CHILL/C program extended from said first step.

3. The host DBMS simulation method according to claim 1, wherein said second procedure is composed of a first step of making out the HDS sever code by C-language;
   a second step of generating DBMS kernel executing file for an object host after the kernel program used in DREAM-S of real time DBMS is compiled by C compiler; and
   a third step of generating one server executing file after compiling upon linking the DBMS kernel executing file generated from said second step to the HDS server code.

4. The host DBMS simulation method according to claim 1, wherein said fourth procedure is composed of a first step of deciding whether a normal command whose the performance is possible is inputted or not according to the analysis result, after analyzing in the host library one query process requirement occurred in the user application program;
   a second step performing communication with the HDS server in the case that a normal command whose the analysis result performance is possible is inputted according to the decision result from said first step, reporting the performing result in the form of patterned to users, and ending the performance; and
   a third step carrying out an error process for the inputted query process requirement in the case that the decision result from said first step can not be processed on the host DBMS simulator, or a command requirement form is not right, ending the performance.

5. The host DBMS simulation method according to claim 1, wherein said fifth procedure is composed of a first step of initiating for performing the HDS server after the HDS server starts the performance by a HDS server administrator;
   a second of analyzing the requirement in the case that an user requirement requesting the process to HDS server is received;
   a third step of performing an operation command process routine in the case that the requirement is an administration command for setting an operation environment according to the analysis result from said second step, setting the server environment, and performing said second step;
   a fourth step of carrying out a query process in the case of the user query process requirement according to the analysis result from the second step, calling the host DBMS, ending the process, resuming said second step; and
   a fifth step of processing the error in the case that the error is confirmed on communication or process according to the analysis result from said second step, resuming said second step.

6. The host DBMS simulation method according to claim 1, wherein said sixth procedure is composed of a first step of for setting the communication environment for communication with HDS server after starting the user requirement;
   a second step of transmitting the changed data structure to HDS server upon using a message queue and shared memory after changing a data structure in the form of transmitting the information using the shared memory;
   a third step of receiving the result after finishing the requesting process, deciding whether the received information is normal or not;
   a fourth step noticing the result to users after passing the communication error restoring procedure in the case that the communication is abnormal according to the decision result from said decision means, and ending the performance; and a fifth step noticing the contents about that the data receiving result is normal to HDS server in the case of deciding in that the performance is normal according to the decision result from said third step, transmitting the response according as the HDS server receiving this confirms that the communication is accurately proceeded, confirming the response, changing to the form of original data which users can process from the form of shared memory in the user side, noticing the performing result to users, and ending the performance.

7. The host DBMS simulation method according to claim 1, wherein said seventh procedure is composed of a first step of setting the communication environment for communication with HDS server after starting the administration requirement, requiring the query process upon transmitting the administration command to HDS server upon using a message queue;

a second step of receiving the result after finishing the requiring process from said first step, deciding whether the received information is normal or not;

a third step of noticing the result to users after passing the communication error restoring procedure in the case that the communication is abnormal according to the decision result from said second step, and ending the performance; and a fourth step of noticing the contents about that the data receiving result is normal to HDS server in the case of deciding in that the received information is normal according to the decision result from said second step, transmitting the response according as the HDS server receiving this confirms that the communication is accurately proceeded, confirming the response, reporting the performing result to users of the HDS server to the administration command, and ending the performance.

8. The host DBMS simulation method according to claim 1, wherein said eighth procedure is composed of a first step of setting communication environment for communication with HDS server after starting the user requirement;

a second step of receiving a requirement and information from the user side, deciding whether the received requirement and information are normal;

a third step of transmitting the reasons of communication state or data process impossibility to the requesting user side in the case that the received requirement and information are abnormal according to the decision result from said second step, deciding whether the corresponding request is an administration command or a query process requirement command in the case that the performing results are normal according to the decision result of said second step;

a fourth step of performing the function processing the administration command in the case of the administration command according to the decision result from said third step, transmitting the process result to the user side;

a fifth step of receiving the response if the user side receiving the transmitted process result from said fourth step sends the confirmed response to the result which one receives, deciding whether the received result is normal;

a sixth step of noticing the performance resumption of HDS server side to the user side if the decision result is normal from said fifth step, resuming the operation of said second step;

a seventh step of restoring the error if the decision result is abnormal from said fifth step, resuming the operation of said second step;

an eighth step of changing to the form of processable in the HDS kernel the form of shared memory if the corresponding request is a query process command according to the decision result of said third step, performing the HDS kernel process, transmitting the query process result to the user side after changing in the form of transmitting the shared memory for transmitting the performing result finishing the kernel performance to the user side again;

a ninth step of receiving the response if the user side receiving the query process result sends the confirmed response to the result which one receives, deciding whether the received result is normal or not; and a tenth step of noticing the performing resumption of HDS server side to the user side if the received result is normal according to the decision result of said ninth step, resuming the operation of said second step, restoring the error if the receiving result is abnormal, resuming said second step.

9. A host DBMS simulator, which comprises:

an user part of a performable A address space composed of a query of EDML(Embedded Data Manipulation Language) form included in a plurality of application CHILL/C program extended to a code which CHILL/C compiler can recognize, EDML processor and compiler compiling the extended code, an application executing file of executing file generated through said compiler and host library, a PLD(Processor Load Data), and an administration command loading said a PLD to the server, providing the usage authority to the loaded a PLD, and carrying out a series of server executing environment setting work of permitting share;

a HDS server part of a performable C address space composed of a HDS(Host DBMS Simulator) server and DBMS(Database Management System) kernel; and an IPC part of performable B address space controlling the communication of said user part and HDS server part composed of a shared memory and message queue.

10. A host DBMS simulator, which comprises:

a library generating means generating a library;

a HDS server generation means generating the HDS server;

a communication control means controlling communication between a library and server generated respectively from said library and HDS server generating means;

a first library process means processing an user library when a query process requirement occurs in CHILL/C program which users make out;

a service process means processing the service requested to the HDS server through the library processed from said library process means;

a second library process means processing the library during communication between the library and HDS server when users require;

an administration command process means processing an administration command during communication between the library and HDS server when users require; and a HDS server process means processing the HDS server during communication between the library and HDS server.

11. The host DBMS simulator according to claim 10, wherein said library generating means is composed of an extending means extending a query EDML included in CHILL/C program to CHILL/C program upon processing by means of EDML an application code having Structured Query process Language(SQL) of software for driving the exchanger; and a generating means generating a library executing file upon CHILL/C compiling the library program, generating the executing file having the library upon linking the generated library executing file when CHILL/C-compiling CHILL/C program extended from said extended means.

12. The host DBMS simulator according to claim 10, wherein said HDS server generating means is composed of a C-language making out means which HDS sever code is made out by C-language;

a first generating means generating DBMS kernel executing file for an object host after the kernel program used in DREAM-S of real time DBMS is compiled by C compiler; and a second generating means generating one server executing file after compiling upon linking DBMS kernel executing file generated from said first generation means to the HDS server code of said C language making out means.

13. The host DBMS simulator according to claim 10, wherein said first library process means is composed of a decision means deciding whether a normal command whose the performance is possible is inputted or not, after analyzing in the host library one query process requirement occurred in the user application program;

an user reporting means performing communication with the HDS server, reporting the performing result in the form of patterned to users, and ending the performance in the case that a normal command whose the analysis result performance is possible is inputted according to the decision result from said decision means; and an error process means carrying out an error process for the inputted query process requirement in the case that the decision result from said decision means can not be processed on the host DBMS simulator, or a command requirement form is not right, ending the performance.

14. The host DBMS simulator according to claim 10, wherein said service process means is composed of an initializing means initializing for performing the HDS server after the HDS server starts the performance by a HDS server administrator;

an analysis means analyzing the requirement in the case that an user requirement requiring the process to HDS server is received;

a server environment setting means performing an administration command process routine in the case that the requirement is an administration command for setting an administration environment according to the analysis result from said analysis means, setting the server environment, and resuming the operation of said analysis means upon feeding back the set server environment to said analysis means;

a DBMS call process means carrying out a query process in the case of the user query process requirement according to the analysis result from the analysis means, calling the host DBMS, ending the process, resuming the operation of said analysis means upon feeding back the process result to said analysis means; and an error process means processing the error in the case that the error is confirmed on communication or process according to the analysis result from said analysis means, resuming the operation of said analysis means upon feeding back the processed result to said analysis means.

15. The host DBMS simulator according to claim 10, wherein said second library process means is composed of a communication environment setting means for setting the communication environment for communication with HDS server after starting the user requirement;

a transmitting means transmitting the changed data structure to HDS server upon using a message queue and shared memory after changing a database structure in the form of transmitting the information using the shared memory;

a decision means receiving the result after finishing the requesting process, deciding whether the received information is normal or not;

a first user noticing means noticing the result to users after passing the communication error restoring procedure in the case that the communication is abnormal according to the decision result from said decision means, and ending the performance; and a second user noticing means noticing the contents about that the data receiving result is normal to HDS server in the case of deciding in that the performance is normal according to the decision result from said decision means, transmitting the response according as the HDS server receiving this confirms that the communication is accurately proceeded, confirming the response, changing to the form of original data which users can process from the form of shared memory in the user side, noticing the performing result to users, and ending the performance.

16. The host DBMS simulator according to claim 10, wherein said administration command process means is composed of a query process requiring means for setting the communication environment for communication with HDS server after starting the administration requirement, transmitting the administration command to HDS server upon using a message queue;

a decision means receiving the result after finishing the requiring process from said query process requirement means, deciding whether the received information is normal or not;

a first user noticing means noticing the result to users after passing the communication error restoring procedure in the case that the communication is abnormal according to the decision result from said decision means, and ending the performance; and a second user noticing means noticing the contents about that the data receiving result is normal to HDS server in the case of deciding in that the performance is normal according to the decision result from said decision means, transmitting the response according as the HDS server receiving this confirms that the communication is accurately proceeded, confirming the response, changing to the form of original data which users can process from the form of shared memory in the user side, noticing the performing result to users, and ending the performance.

17. The host DBMS simulator according to claim 10, wherein said HDS server process means is composed of a communication environment setting means for setting the communication environment for communication with HDS server after starting the user requirement;

a first decision means receiving a requirement and information from the user side, deciding whether the received requirement and information are normal;

a second decision means transmitting the reasons of communication state or data process impossibility to the requesting user side in the case that the received requirement and information are abnormal according to the decision result from said first decision means, deciding whether the corresponding request is an administration command or a query process requirement command in the case that the received requirement and information are normal according to the decision result of said decision means;

a transmitting means performing the function processing the administration command in the case of the administration command from said second decision means, transmitting the process result to the user side;

a third decision means receiving the response if the user side receiving the transmitted process result by said transmitting means sends the confirmed response to the result which one receives, deciding whether the received result is normal;

an user reporting means noticing the performance resumption of HDS server side to the user side if the decision result is normal from said third decision means, resuming the operation of said first decision means;

a first error restoring means restoring the error if the decision result is abnormal from said third decision means, resuming the operation of said first decision means;

a transmitting means changing to the form of processable in the HDS kernel the form of shared memory if the corresponding request is a query process command according to the decision result of said second decision means, performing the HDS kernel process, transmitting the query process result to the user side after changing in the form of transmitting the shared memory for transmitting the performing result finishing the kernel performance to the user side again;

a fourth decision means receiving the response if the user side receiving the query process result sends the confirmed response to the result which one receives, deciding whether the received result is normal or not; and a second error restoring means noticing the performing resumption of HDS server side to the user side if the received result is normal according to the decision result of said fourth decision means, resuming the operation of said first decision means, restoring the error if the receiving result is abnormal, resuming the operation of said first decision means.

* * * * *